United States Patent [19]

Burch

[11] Patent Number: 5,267,433
[45] Date of Patent: Dec. 7, 1993

[54] AIR TURBINE STARTER HAVING A DUAL CLUTCH

[75] Inventor: Darrel W. Burch, Phoenix, Ariz.

[73] Assignee: Allied-Signal, Inc., Morris Township, Morris County, N.J.

[21] Appl. No.: 858,368

[22] Filed: Mar. 25, 1992

[51] Int. Cl.$^5$ ............................................... F02C 7/26
[52] U.S. Cl. ........................... 60/39.142; 192/48.3; 192/67 R; 192/99 A
[58] Field of Search ............ 60/39.142; 192/48.3, 192/48.7, 99 A, 99 S, 67 R

[56] References Cited

U.S. PATENT DOCUMENTS

| | | | |
|---|---|---|---|
| 2,721,482 | 10/1955 | Shank et al. | 60/39.142 |
| 2,999,356 | 9/1961 | Ferguson, Jr. | 60/39.142 |
| 3,003,313 | 10/1961 | Bunger | 60/39.142 |
| 3,087,305 | 4/1963 | Hertzog . | |
| 3,360,928 | 1/1968 | Valentine et al. | 60/39.142 |
| 3,521,505 | 7/1970 | Sebring . | |
| 4,253,557 | 3/1981 | Bunger | 192/54 |
| 4,427,101 | 1/1981 | Maucher et al. | 192/48.7 |
| 4,768,634 | 12/1988 | Quick et al. | 192/56 R |
| 4,773,518 | 9/1988 | Road et al. | 192/67 R |
| 4,871,296 | 10/1989 | Laessle et al. | 60/39.142 |
| 4,899,534 | 2/1990 | Sorenson | 60/39.06 |
| 4,914,906 | 4/1990 | Burch | 60/39.142 |
| 4,926,631 | 5/1990 | Sorenson | 60/39.142 |

OTHER PUBLICATIONS

"ATS Dual (Sprag) Clutch & Double Clutch" Garrett Engine Division Sep. 7, 1990–Video.

*Primary Examiner*—Richard A. Bertsch
*Assistant Examiner*—Michael I. Kocharov
*Attorney, Agent, or Firm*—Joseph R. Black; Troy Lester; Robert A. Walsh

[57] ABSTRACT

This invention relates to a clutch mechanism for selective power transmission between starter means and an engine. More particularly, the invention discloses a dual clutch mechanism for use in selectively coupling a turbine driven starter assembly with a gas turbine engine to affect engine start up and disengage thereafter. The invention provides a clutch mechanism, comprised of two clutches in series, which can deliver positive torque transmission from a starter to an engine at any speed within an operating range and disengages at any speed greater than the operating range.

10 Claims, 2 Drawing Sheets

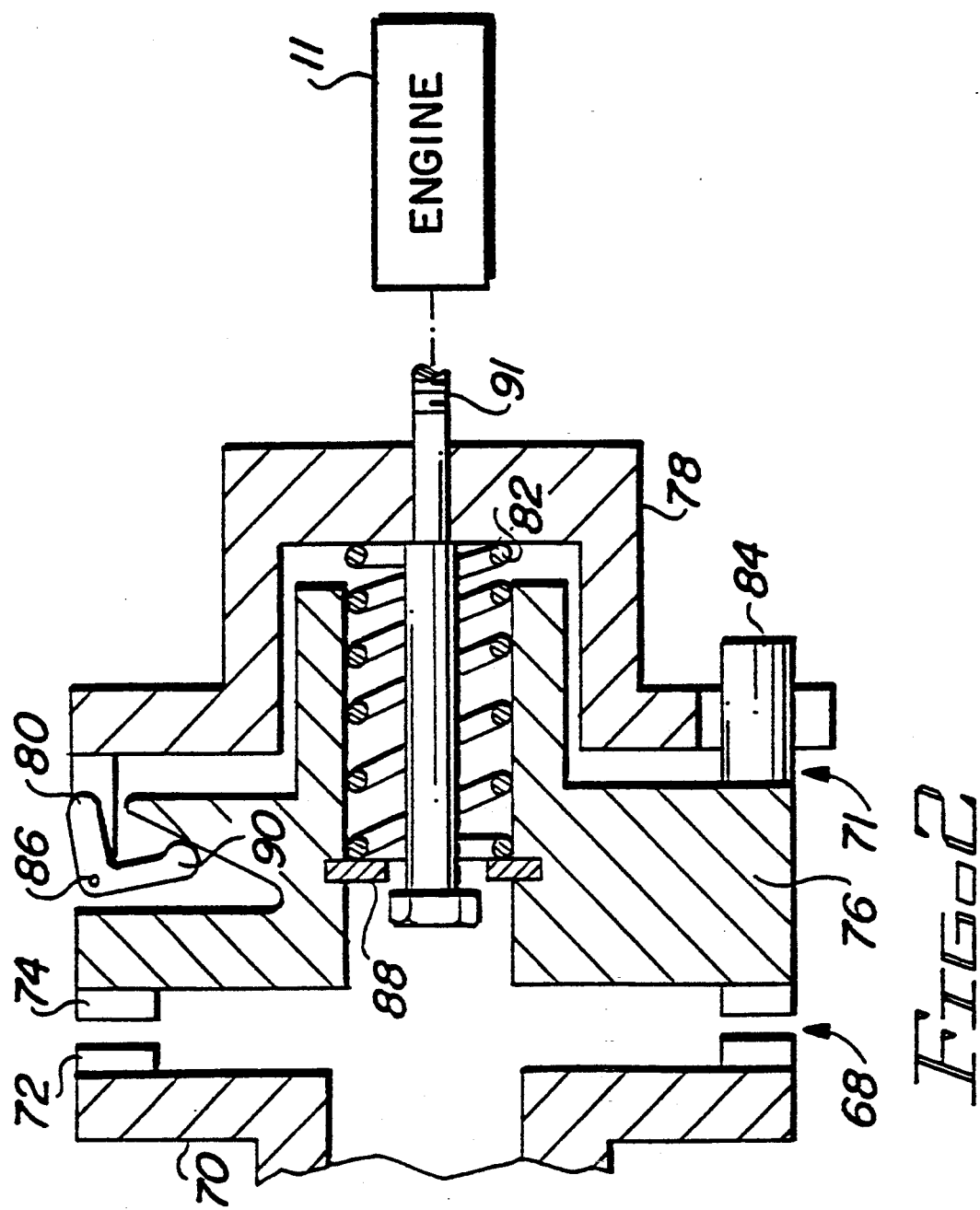

AIR TURBINE STARTER HAVING A DUAL CLUTCH

TECHNICAL FIELD

This invention relates to a dual clutch mechanism for selective power transmission between a starter and an engine. More particularly, the invention discloses a dual clutch mechanism for use in selectively coupling a turbine driven starter assembly with a gas turbine engine in order to effect engine start-up and thereafter disengage.

BACKGROUND ART

Turbine driven starters for starting gas turbine engines have been used for a number of years. Representative patents include U.S. Pat. Nos. 3,087,305; 3,521,505; 4,899,534; 4,926,631, all of which are assigned to the assignee of the present invention, as well as U.S. Pat. No. 4,914,906. Each of these patents depicts an air turbine starter adapted to receive motive gas flow and to produce output rotation of a rotor. The rotor is coupled by various types of gear and clutch means to an output shaft which transfers power to the gas turbine engine. By this arrangement, the motive gas flow impinging on the air turbine commences a start cycle wherein the rotating assembly within the gas turbine engine is accelerated to self-sustaining speed, this speed being the starter assist speed. Once starter assist speed has been obtained, the motive gas flow to the starter is shut off and the clutch within the starter decouples to prevent the starter from being driven by the engine.

Various clutches such as those within the above cited patents have been utilized to engage/disengage the starter unit from the engine. The U.S. Pat. No. 4,914,906 patent describes a double clutch mechanism in which the two clutches operate in parallel according to the relative speeds of the starter and the engine. The clutch mechanism utilizes a primary clutch to engage during low engine speeds and a secondary clutch to engage during high starter speeds. While the U.S. Pat. No. 4,914,906 clutch mechanism allows for engine restart at any speed, it allows ratcheting of the secondary clutch at high speeds and ratcheting of the primary clutch at low speeds. Such an arrangement requires lubrication of at least one clutch at all times after commencement of the start cycle.

Accordingly, a need exists for an air turbine starter with a non-lubricated clutch mechanism which transmits torque for speeds within a desired operating range, but completely disengages during engine overrunning. Preferably, this clutch mechanism is completely engaged prior to commencement of any starting operation, thus providing minimum backlash and minimum engagement torque.

SUMMARY OF THE INVENTION

The present invention meets the above-stated need through the use of a starter assembly having two clutches working in series to selectively engage/disengage the starter and engine so that torque transmission occurs only when both clutches are engaged. The clutches preferably include an overrunning first clutch which engages whenever the starter speed equals or begins to exceed the engine speed and a second clutch, located outside of the starter housing, that is engaged from zero rpm through speeds within an operating range and disengages whenever the engine is rotating above the operating range. Thus, torque transmission occurs only when the engine speed is within the operating range and the starter speed equals or begins to exceed the engine speed. Moreover, the location of the second clutch outside the starter housing enables the use of less robust bearings and seals than would otherwise be required.

BRIEF DESCRIPTION OF THE DRAWINGS

FIG. 2 is a partially cross-sectional and partially schematic view of the second clutch as a pair of clutch jaws in disengagement.

Figure 1:
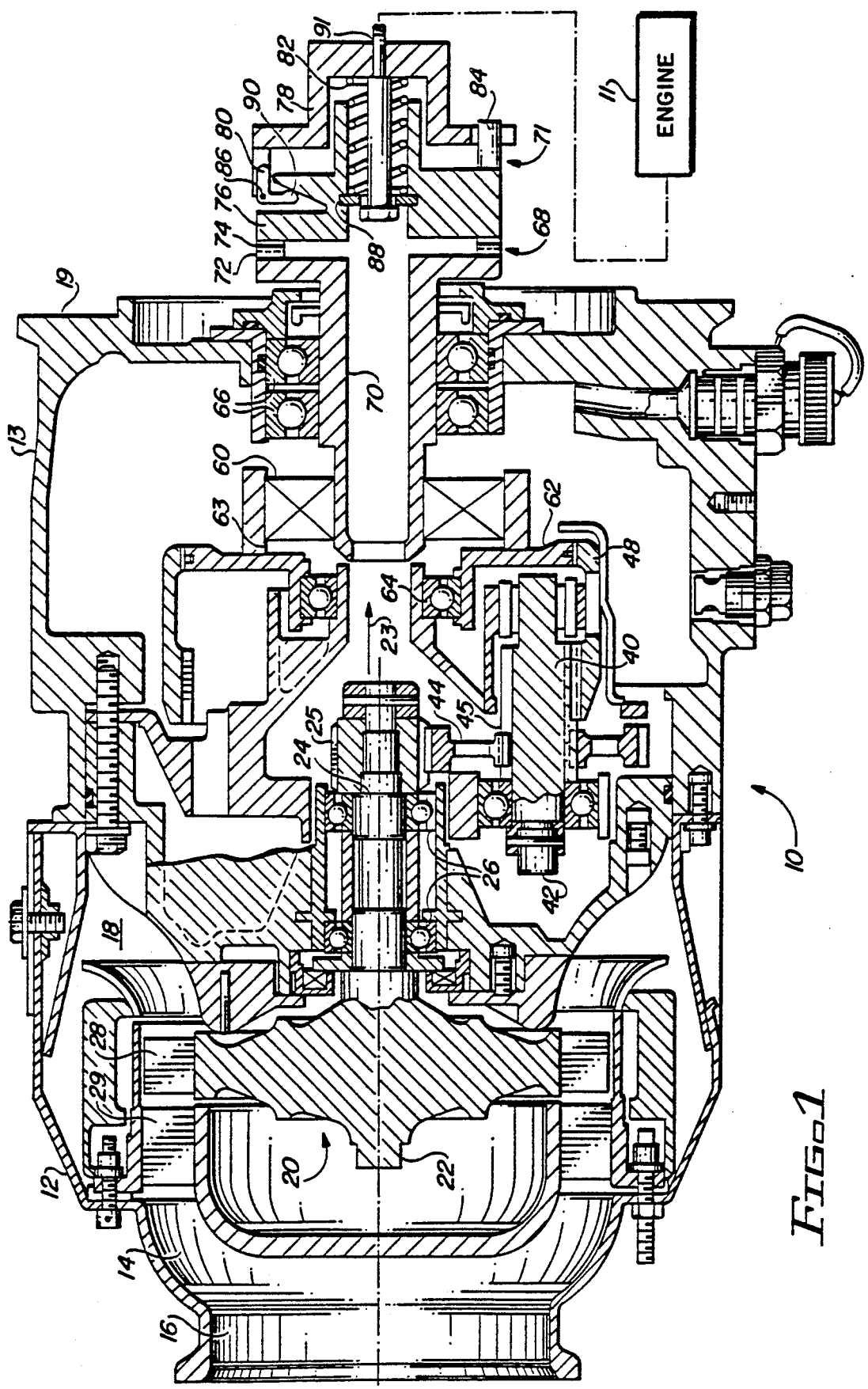
FIG. 1 is a partially cross-sectional and partially schematic view of an air turbine starter employing the present invention.

All descriptive information contained in the drawings is incorporated herein by reference thereto as though provided in textual form.

DESCRIPTION OF THE PREFERRED EMBODIMENT

Referring to the drawings, FIG. 1 shows an air turbine starter 10 embodying the present invention to selectively engage with an engine 11. The air turbine starter 10 is comprised of a first housing assembly 12 and a second housing assembly 13. The housing assembly 12 defines a flow path 14 extending from an inlet 16 to an outlet 18. The housing assembly 13 includes a mounting flange 19 for mounting the air turbine starter to the engine 11.

Within the starter 10, the housing assemblies 12 and 13 support a turbine section 20, a compound planetary gear train 40 and an overrunning first clutch 60 described in greater detail below.

The turbine section 20 is comprised of a turbine wheel 22 having rotatable shaft 24 extending in an axial direction 23 and journaled in bearings 26. A gear 25 is secured to the shaft 24 for transferring torque. A plurality of turbine blades 28 radially extend from the turbine wheel 22 into the flow path 14. Upstream of the blades 28 are a plurality of nozzles 29 mounted to the housing assembly 12 for veering the air flow before it traverses the turbine blades 28. In operation, pressurized air enters through the inlet 16, is angled by the nozzles 29, is expanded across the blades 28, and exits through the outlet 18. The blades 28 convert the pressure energy of the air into rotary motion causing the turbine wheel 22, the shaft 24, and the gear 25 to rotate at the same speed as the blades 28.

The compound planetary gear train 40 is comprised of a plurality of circumferentially-spaced shafts 42 each having a gear 44 that meshes with the gear 25. A gear 45 integral with the shaft 42 engages a ring gear 48 which in turn engages a hub gear 62. The hub gear 62 is supported by bearings 64 and has a hollow cylindrical hub portion 63 encircling the overrunning first clutch 60. In operation, the gear train 40 converts the high speed, low torque output of the turbine section 20 into low speed, high torque input for the first clutch 60.

The first clutch 60 is preferably a sprag type clutch, but any overrunning type clutch would accomplish the objectives of the invention. A pawl and ratchet clutch with the pawls attached to an inner diameter driving member and the ratchets attached to an outer diameter driven member would be an alternative. The hub gear 62 operates as an output member to transfer torque to the input side of clutch 60 through the hub portion 63. As shown in the drawings, a clutch drive shaft 70 is operative as a power transfer member and receives the torque from the output side of clutch 60. In the preferred embodiment, the clutch drive shaft 70 is supported by bearings 66 and extends outside of the housing 13.

The first clutch 60 is positively engaged and transfers torque when the hub portion 63 rotates at the same speed or begins to exceed the speed of the clutch drive shaft 70. Engine start up begins with the flow of pressurized air rotating the turbine wheel 22 which transfers torque through the planetary geartrain 40 to the hub gear 62. At this point, the hub portion 63 begins to rotate faster than the stationary clutch drive shaft 70 so the first clutch 60 engages and transfers torque therebetween.

The clutch drive shaft 70 is connected to the input side of a second clutch 68. Connected to the output side of the second clutch 68 is a driven assembly 71 which is coupled to the engine 11. In the preferred embodiment, the second clutch 68 and the driven assembly 71 are located outside of housing 13 such that when the second clutch 68 disengages, all components within the starter 10 can come to a complete rest.

The second clutch 68 is a jaw clutch which is comprised of two clutch jaws, in this case jaws 72 and 74. Clutch jaw 72 is connected to the clutch drive shaft 70 and clutch jaw 74 is connected to a slidable disk 76 which is part of the driven assembly 71. The slidable disk 76 is connected to rotate with the output shaft 78, which is also part of the driven assembly 71, through three equiangularly-spaced torque teeth 84. Equiangularly-spaced between the torque teeth are three flyweights 80 (only one shown) connected to the output shaft 78 by three pins 86 (only one shown) and have essentially radially inward extending portions 90 that abut the slidable disk 76. To urge clutch jaw 74 axially into clutch jaw 72, a spring 82 is interposed between the output shaft 78 and the slidable disk 76 by abutting a retaining ring 88 as shown.

At initial start up, the second clutch 68, urged into engagement by the spring 82, transfers torque from the clutch drive shaft 70 to the slidable disk 76. The torque teeth 84 transfer the torque between the slidable disk 76 and the output shaft 78. The driven assembly 71 is connected to rotate with the engine 11 through a tie bolt 91 and transfers the torque to the engine 11 through engaging means (not shown). Torque is transferred to the engine 11 until engine starter assist speed when the engine 11 begins to accelerate on its own power. At this time, gas flow to the starter is shut off and the engine 11 rotates the driven assembly 71. At this point disengagement of the second clutch 68 will allow all components within the starter 10 to come to rest. Thus, an operating range of the second clutch 68 is defined from initial start up (zero rpm) to a speed greater than engine starter assist speed at which disengagement is desired.

FIG. 2 depicts the second clutch 68 when the driven assembly 71 is being rotated by the engine 11 beyond its operating range. As the driven assembly 71 accelerates with engine 11 from starter assist speed, the flyweights 80 pivot about the pins 86 due to centrifugal forces. Once the driven assembly 71 is rotating beyond the operating range, the centrifugal force exerted on the flyweights 80 overcomes the biasing force exerted by the spring 82. The radially inward extending portions 90 of the flyweights 80 abut the slidable disk 76 and slide it in the axial direction 23 such that the second clutch 68 is disengaged.

During engine rolldown, the engine 11 speed is decreased until the centrifugal force on the flyweights 80 is overcome by the biasing force of spring 82 and the slidable disk 76 is urged to engage the second clutch 68. The clutch drive shaft 70 begins to rotate with the driven assembly 71. If the starter 10 is not operating, the hub gear 62 is not rotating. Thus, the clutch drive shaft 70 will be rotating faster than the hub gear 62 and the first clutch 60 will overrun and prevent the torque transfer to the hub gear 62.

To perfect an engine restart, the starter 10 begins acceleration until the hub gear 62 rotates at the same speed as the clutch drive shaft 70. Then the first clutch 60 switches from overrunning mode to positive engagement and begins transferring torque. The engine 11 reaches starter assist speed again and accelerates the driven assembly 71 beyond the second clutch 68 operating range. The second clutch 68 disengages and the starter 10 is shut off and coasts to rest.

The foregoing description of the preferred embodiment is intended as illustrative rather than restrictive. The full scope of the invention should be construed by reference to the following claims, as reasonably interpreted in view of the teaching herein.

What is claimed is:

1. An air turbine starter adapted for selective engagement with a driven device comprising:
    a housing defining an inlet, an outlet, and a flow path extending between said inlet and said outlet for channelling a flow of pressurized motive gas therethrough;
    turbine means, journaled in said housing and defining a rotational axis, for receiving said motive gas and extracting energy therefrom to effect rotation of said turbine means about said rotational axis;
    gear transmission means journaled in said housing in driven relation to said turbine means for converting said rotation of said turbine means to a torque output;
    an output member journaled in said housing in driven relation to said gear transmission means for receiving said torque output;
    a power transfer member journaled in said housing;
    an overrunning clutch interposed between said output member and said power transfer member for unidirectionally transferring said torque output from said output member to said power transfer member;
    a jaw clutch interposed and operable when engaged between said power transfer member and said driven device;
    means, secured to said driven device, for disengaging said jaw clutch in response to centrifugal force resulting from rotation of said driven device; and
    biasing means operably associated with said jaw clutch for urging said jaw clutch into engagement.

2. The starter of claim 1 wherein said overrunning clutch is a sprag clutch.

3. The starter of claim 1 wherein said jaw clutch is comprised of a first clutch jaw secured to said power transfer member and disposed outside of said housing, and a second clutch jaw secured to said driven device.

4. The starter of claim 3 wherein said second clutch jaw is moved in a direction parallel to said rotational axis to effect disengagement of said jaw clutch while said first clutch jaw remains in substantially constant axial postiion.

5. The starter of claim 4 wherein said means for disengaging said jaw clutch is comprised of a plurality of disengagement members circumferentially placed and connected to pivot to said driven device, said disengaging members abut said second clutch jaw such that rotation of said driven device causes said disengagement members to push said second clutch jaw in said direction away from said first clutch jaw effecting said jaw clutch disengagement.

6. The starter of claim 5 wherein said disengagement members are flyweights circumferentially located and pivotally connected to said driven device, said flyweights being rigid and L shaped.

7. An air turbine starter, comprising:
- a housing for channelling a flow of pressurized motive gas;
- turbine means journaled in said housing for receiving said motive gas and extracting energy therefrom;
- gear transmission means secured in driven relation to said turbine means for converting said energy to a torque output;
- an output member secured in driven relation to said gear transmission means for receiving said torque output;
- a rotatable power transfer member journaled in said housing;
- a sprag clutch operably secured to said output member and said power transfer member for transferring said torque output from said output member to said power transfer member;
- a rotatable output shaft;
- a first clutch jaw connected to said power transfer member and a complimentary second clutch jaw connected to said output shaft for transferring said torque output therebetween when said first clutch jaw is adjacent said second clutch jaw;
- disengaging means, secured to said output shaft, for separating said first clutch jaw from said second clutch jaw in response to centrifugal force resulting from rotation of said output shaft; and
- a spring operably associated with said second clutch jaw for urging said second clutch jaw adjacent said first clutch jaw.

8. An air turbine starter adapted for selective engagement with a driven device, comprising:
- a housing defining an inlet, an outlet, and a flow path extending between said inlet and said outlet for channelling a flow of pressurized motive gas therethrough;
- turbine means journaled in said housing for receiving said motive gas and extracting energy therefrom;
- gear transmission means journaled in said housing in driven relation to said turbine means for converting said energy from said turbine to a torque output;
- a first clutch jaw connected to said gear transmission means and a complimentary second clutch jaw connected to said driven device for transferring said torque output from said gear transmission means to said driven device when said first clutch jaw is adjacent said second clutch jaw;
- a spring operably associated with said second clutch jaw for urging said second clutch jaw adjacent to said first clutch jaw;
- disengaging means, secured to said driven device, for separating said first clutch jaw from said second clutch jaw in response to centrifugal force resulting from rotation of said driven device.

9. The starter of claim 8 wherein said disengaging means is comprised of a plurality of disengagement members circumferentially placed and connected to said driven device so as to be pivotable relative thereto, said disengaging members being operatively associated with said second clutch jaw such that rotation of said driven device causes said disengagement members to separate said second clutch jaw from said first clutch jaw.

10. The starter of claim 9 wherein said disengagement members for disengaging said second clutch are flyweights circumferentially located and pivotally connected to said driven device, said flyweights being substantially L shaped.

* * * * *